(12) United States Patent
Imai et al.

(10) Patent No.: US 12,533,943 B2
(45) Date of Patent: Jan. 27, 2026

(54) IN-WHEEL MOTOR

(71) Applicant: TOYOTA JIDOSHA KABUSHIKI KAISHA, Toyota (JP)

(72) Inventors: Keita Imai, Seto (JP); Kiichi Yokoyama, Toyota (JP); Hiroki Monji, Toyota (JP); Yusuke Ueta, Shizuoka-ken (JP); Tatsuya Sakai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 314 days.

(21) Appl. No.: 18/496,181

(22) Filed: Oct. 27, 2023

(65) Prior Publication Data

US 2024/0253448 A1    Aug. 1, 2024

(30) Foreign Application Priority Data

Jan. 30, 2023 (JP) ................................ 2023-012217

(51) Int. Cl.
*B60K 7/00* (2006.01)
*H02K 9/19* (2006.01)

(52) U.S. Cl.
CPC ............. *B60K 7/0007* (2013.01); *H02K 9/19* (2013.01); *B60K 2007/0038* (2013.01)

(58) Field of Classification Search
CPC .................................................. B60K 7/0007
See application file for complete search history.

(56) References Cited

U.S. PATENT DOCUMENTS

| 5,382,854 | A | * | 1/1995 | Kawamoto | ............ | B60K 17/046 |
| | | | | | | 310/67 R |
| 2009/0227408 | A1 | * | 9/2009 | Imamura | ................ | B60W 20/10 |
| | | | | | | 475/5 |
| 2013/0057048 | A1 | * | 3/2013 | Ishikawa | .................... | B60L 7/24 |
| | | | | | | 301/6.5 |
| 2013/0065724 | A1 | * | 3/2013 | Shinohara | ............ | B60K 17/046 |
| | | | | | | 475/159 |
| 2013/0150211 | A1 | * | 6/2013 | Aoki | ...................... | B60W 10/02 |
| | | | | | | 477/86 |
| 2013/0153338 | A1 | * | 6/2013 | Yamauchi | ................. | H02K 9/19 |
| | | | | | | 184/26 |
| 2013/0292993 | A1 | * | 11/2013 | Yukishima | ............ | B60K 7/0007 |
| | | | | | | 301/6.5 |

(Continued)

FOREIGN PATENT DOCUMENTS

| JP | 2017-057970 A | 3/2017 |
| JP | 2021-138340 A | 9/2021 |

*Primary Examiner* — Erez Gurari
(74) *Attorney, Agent, or Firm* — SoraIP, Inc.

(57) ABSTRACT

An in-wheel motor having a case including a motor case, a motor cover, and a reduction gear case, wherein the oil pump includes a pump chamber formed in the motor cover, a pump cover attached to the motor cover and closing the pump chamber, It has a pump shaft that penetrates the pump cover, a drive gear that is attached to the pump shaft and arranged inside the pump chamber, and a driven gear that meshes with the drive gear and is arranged inside the pump chamber, the pump shaft is attached to the input shaft of the reduction gear, the pump cover is bolted to the motor cover from the inside of the case, and the pump cover is integrally formed with a positioning structure for determining the position of the pump shaft.

3 Claims, 8 Drawing Sheets

(56) References Cited

U.S. PATENT DOCUMENTS

| | | | |
|---|---|---|---|
| 2013/0342150 A1* | 12/2013 | Ozaki | F16H 57/0476 |
| | | | 318/490 |
| 2014/0041619 A1* | 2/2014 | Yamauchi | F16H 57/0486 |
| | | | 123/196 R |
| 2015/0158381 A1* | 6/2015 | Shin | B60K 7/0007 |
| | | | 475/149 |
| 2021/0001712 A1* | 1/2021 | Misu | F16H 57/0426 |
| 2021/0167659 A1* | 6/2021 | Myouki | H02K 5/225 |
| 2024/0253448 A1* | 8/2024 | Imai | H02K 9/19 |

* cited by examiner

IN-WHEEL MOTOR

CROSS-REFERENCE TO RELATED APPLICATION

This application claims priority to Japanese Patent Application No. 2023-012217 filed on Jan. 30, 2023, incorporated herein by reference in its entirety.

BACKGROUND

1. Technical Field

The present disclosure relates to in-wheel motors.

2. Description of Related Art

Japanese Unexamined Patent Application Publication No. 2021-138340 (JP 2021-138340 A) discloses an in-wheel motor including: a case including a motor cover composed of a first cover member and a second cover member; and an oil pump provided in the case. In this in-wheel motor, oil passages formed between the first and second cover members communicate with the oil pump.

SUMMARY

In the configuration described in JP 2021-138340 A, when combining the first and second cover members that form the oil passages, it is necessary to screw bolts from outside the case into the first cover member and the second cover member in this order to bolt the second cover member to the first cover member. That is, these bolted portions include bolt holes in the first motor cover that open toward the outside of the case. Therefore, when the oil pump pumps oil into the oil passage, the oil may leak to the outside of the case through the bolted portions.

The present disclosure has been made in view of such circumstances, and it is an object of the present disclosure to provide an in-wheel motor that can reduce oil leakage due to hydraulic pressure generated by an oil pump.

An in-wheel motor according to the present disclosure includes: a motor mounted inside a wheel; a reduction gear including an input shaft attached to a rotor shaft of the motor and configured to transmit power of the motor to the wheel; a case housing the motor and the reduction gear; and an oil pump disposed in the case.

The case includes a motor case housing the motor, a motor cover attached to the motor case, and a reduction gear case attached to an opposite side of the motor case from the motor cover and housing the reduction gear.

The in-wheel motor is characterized in that the oil pump includes a pump chamber in the motor cover, a pump cover attached to the motor cover and closing the pump chamber, a pump shaft extending through the pump cover, a drive gear attached to the pump shaft and disposed in the pump chamber, and a driven gear meshing with the drive gear and disposed in the pump chamber, the pump shaft is attached to an input shaft of the reduction gear, the pump cover is bolted to the motor cover from inside the case, and a positioning structure that positions the pump shaft is molded integrally with the pump cover.

According to this configuration, when attaching the pump cover to the motor cover, the pump cover can be bolted to the motor cover from inside the case. Therefore, bolting from outside the case is not necessary. This can reduce oil leakage due to hydraulic pressure generated by the oil pump.

The positioning structure may include a boss portion through which the pump shaft is inserted, and the positioning structure may support the pump shaft via a bearing attached to an inner peripheral surface of the boss portion.

According to this configuration, the pump shaft can be supported by the positioning structure of the pump cover.

The motor cover may include a housing portion having a tubular shape, protruding toward inside of the case in an axial direction, and housing the pump cover. The in-wheel motor may further include: a bearing attached to inside of the housing portion and configured to rotatably support the rotor shaft; and a resolver attached to outside of the housing portion and configured to detect a number of rotations of the rotor shaft.

According to this configuration, after the pump cover and the bearing are disposed in the housing portion of the motor cover, the resolver is attached to the outside of the housing portion. This makes it easier to route a wire harness of the resolver outside the motor cover.

In the present disclosure, when attaching the pump cover to the motor cover, the pump cover can be bolted to the motor cover from inside the case. Therefore, bolting from outside the case is not necessary. This can reduce oil leakage due to hydraulic pressure generated by the oil pump.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An in-wheel motor according to an embodiment of the present disclosure will be specifically described below. The present disclosure is not limited to the embodiments described below.

Figure 1:
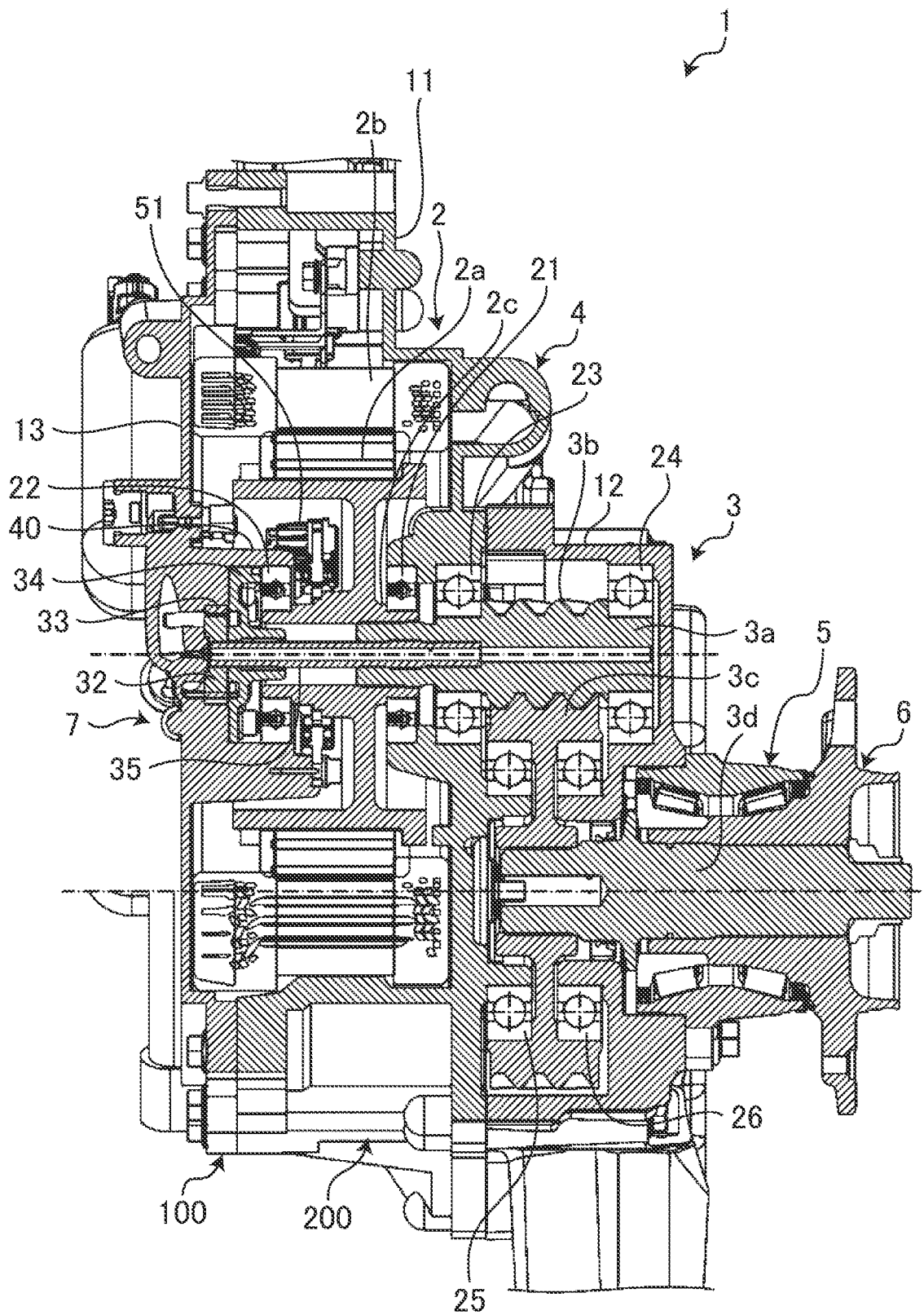
FIG. 1 is a diagram showing an in-wheel motor in an embodiment.

FIG. 1 is a figure showing an in-wheel motor in an embodiment. The in-wheel motor 1 is arranged inside the wheel of the wheel. The in-wheel motor 1 includes a motor 2 that drives wheels and a reduction gear 3 that transmits the power of the motor 2 to the wheels. The reduction gear 3 reduces the speed of rotation of the motor 2 and outputs it. In the in-wheel motor 1, the power output from the motor 2 is transmitted to the wheels via the reduction gear 3. In this description, the axial direction is the same as the width direction of the vehicle. The widthwise outer side of the vehicle is referred to as one axial side, and the widthwise inner side of the vehicle is referred to as the other axial side.

The in-wheel motor 1 includes a case 4 that houses the motor 2 and the reduction gear 3. The case 4 is connected to the lower arm and supported by the vehicle body via the suspension. The case 4 includes a motor case 11 that houses the motor 2, a reduction gear case 12 that houses the reduction gear 3, and a motor cover 13 attached to the motor case 11. The reduction gear case 12 is attached to the motor case 11 on the side opposite to the motor cover 13. The case 4 has a structure in which the reduction gear case 12 is bolted to the motor case 11 on one side in the axial direction, and the motor cover 13 is bolted to the motor case 11 on the other side in the axial direction.

The motor 2 has a rotor 2a, a stator 2b and a rotor shaft 2c. Rotor 2a, stator 2b and rotor shaft 2c are arranged inside motor case 11 and motor cover 13. The rotor 2a is attached to the rotor shaft 2c so as to rotate together with the rotor shaft 2c. The stator 2b is fixed to the inner wall of the motor case 11. The stator 2b includes a stator core and a stator coil wound around the stator core. The motor 2 is a three-phase motor, is electrically connected to a power supply provided in the body of the vehicle, and generates torque by electric power supplied from the power supply. In addition, the motor 2 also functions as a generator that generates power when the rotor 2a is rotated by the power (torque) of the wheels and regenerates the generated power to the power supply device. The motor 2 is connected to the reduction gear 3 so as to be able to transmit power.

The rotor 2a is connected to the gear shaft 3a through a rotor shaft 2c so as to rotate integrally therewith. The rotor shaft 2c is a rotating shaft that functions as an output shaft of the motor 2, and is rotatably supported with respect to the case 4 by a first bearing 21 and a second bearing 22. The rotor shaft 2c is rotatably supported by the motor case 11 via a first bearing 21 and rotatably supported by the motor cover 13 via a second bearing 22. The first bearing 21 is a rolling bearing, and has an inner ring attached to one end of the rotor shaft 2c, an outer ring attached to the motor case 11, and rolling elements. The second bearing 22 is a rolling bearing, and has an inner ring attached to the other end of the rotor shaft 2c, an outer ring attached to the motor cover 13, and rolling elements.

The rotor shaft 2c is a hollow shaft, the inner circumference of which is spline-fitted with the gear shaft 3a. An internal spline is formed at one end of the rotor shaft 2c. An external spline is formed at the other end of the gear shaft 3a. The inner spline of the rotor shaft 2c and the outer spline of the gear shaft 3a are meshed, so that the rotor shaft 2c and the gear shaft 3a are spline-fitted.

The gear shaft 3a extends so as to protrude from the inside of the motor case 11, and the protruding portion is housed inside the reduction gear case 12. The gear shaft 3a is a rotating shaft that functions as an input shaft of the reduction gear 3, and is rotatably supported with respect to the case 4 by a third bearing 23 and a fourth bearing 24. The gear shaft 3a is rotatably supported by the motor case 11 via a third bearing 23 and is rotatably supported by the reduction gear case 12 via a fourth bearing 24. The third bearing 23 is a rolling bearing, and has an inner ring attached to the other end of the gear shaft 3a, an outer ring attached to the motor case 11, and rolling elements. The fourth bearing 24 is a rolling bearing, and has an inner ring attached to one end of the gear shaft 3a, an outer ring attached to the reduction gear case 12, and rolling elements.

The reduction gear 3 is a parallel shaft gear mechanism, and has a small-diameter drive gear 3b that rotates integrally with the gear shaft 3a, and a large-diameter driven gear 3c that meshes with the drive gear 3b. Drive gear 3b and driven gear 3c are arranged inside motor case 11. The drive gear 3b is a gear that outputs the power of the motor 2 to the wheels. The drive gear 3b is a pinion gear integrally formed with the gear shaft 3a, and is composed of a helical gear. The driven gear 3c is an external gear that meshes with the drive gear 3b, and is composed of a helical gear. The driven gear 3c is arranged on the same axis as the output shaft 3d and rotates together with the output shaft 3d. The gear shaft 3a and the output shaft 3d are arranged in parallel.

The driven gear 3c is rotatably supported with respect to the case 4 by a fifth bearing 25 and a sixth bearing 26. The driven gear 3c is rotatably supported with respect to the motor case 11 via a fifth bearing 25 and is rotatably supported with respect to the reduction gear case 12 via a sixth bearing 26. The fifth bearing 25 is a rolling bearing, and has an inner ring attached to the motor case 11, an outer ring attached to the inner peripheral portion of the driven gear 3c, and rolling elements. The sixth bearing 26 is a rolling bearing, and has an inner ring attached to the reduction gear case 12, an outer ring attached to the inner peripheral portion of the driven gear 3c, and rolling elements.

Further, the driven gear 3c has a boss portion on the inner peripheral side, and the inner peripheral portion of the boss portion is spline-fitted with the output shaft 3d. In the driven gear 3c, internal splines are formed on the inner peripheral portion of the boss portion. An external spline is formed at the other end of the output shaft 3d. The inner splines of the driven gear 3c and the outer splines of the output shaft 3d are meshed, so that the driven gear 3c and the output shaft 3d are spline-fitted.

3d of output shafts are rotating shafts which function as an output shaft of the reduction gear 3, and rotate integrally with a wheel. The output shaft 3d is rotatably supported by the reduction gear case 12 via a hub bearing 5.

The hub bearing 5 has an inner ring, rolling elements, and an outer ring, and the outer ring is fixed to the reduction gear case 12. The inner ring of hub bearing 5 is formed by the cylindrical portion of axle hub 6.

Axle hub 6 is rotatably supported by reduction gear case 12 via hub bearing 5. The axle hub 6 is attached to the disk portion of the wheel and rotates integrally with the wheel. The axle hub 6 is connected outside the reduction gear case 12 so as to rotate integrally with the output shaft 3d. A brake disc is fixed to the axle hub 6. The axle hub 6 and the brake disc are fixed to the disc portion of the wheel by bolting. The output shaft 3d, axle hub 6, brake disc and wheel rotate together.

The in-wheel motor 1 also includes an oil pump 7 provided inside the case 4. The case 4 contains oil for cooling the motor 2. The oil pump 7 pumps oil to the oil passage inside the case 4 to supply the oil to the stator 2b. The stator 2b is a portion that requires cooling with oil. Inside the motor case 11, oil accumulates in the lower portion of the motor case 11, so this oil is sucked by the oil pump 7 and pumped to the upper portion of the motor case 11 through the oil passage.

The motor cover 13 is formed with a suction oil passage 41 communicating with the suction port of the oil pump 7 and a discharge oil passage 42 communicating with the discharge port of the oil pump 7. The suction oil passage 41 communicates between an inlet opening to an oil reservoir in the lower portion of the motor case 11 and an intake port of the oil pump 7. The discharge oil passage 42 communicates between the supply port at the top of the motor case 11 and the discharge port of the oil pump 7. As a result, the oil pressure-fed by the oil pump 7 is supplied to the portion of the stator 2b that is arranged above the rotor 2a. Both the suction oil passage 41 and the discharge oil passage 42 are oil passages formed inside the wall of the motor cover 13. The oil pump 7 sucks the oil accumulated in the oil reservoir in the lower portion of the motor case 11 through the suction oil passage 41 and discharges it to the discharge oil passage 42. As a result, the oil is pumped to the discharge oil passage 42.

Figure 2:
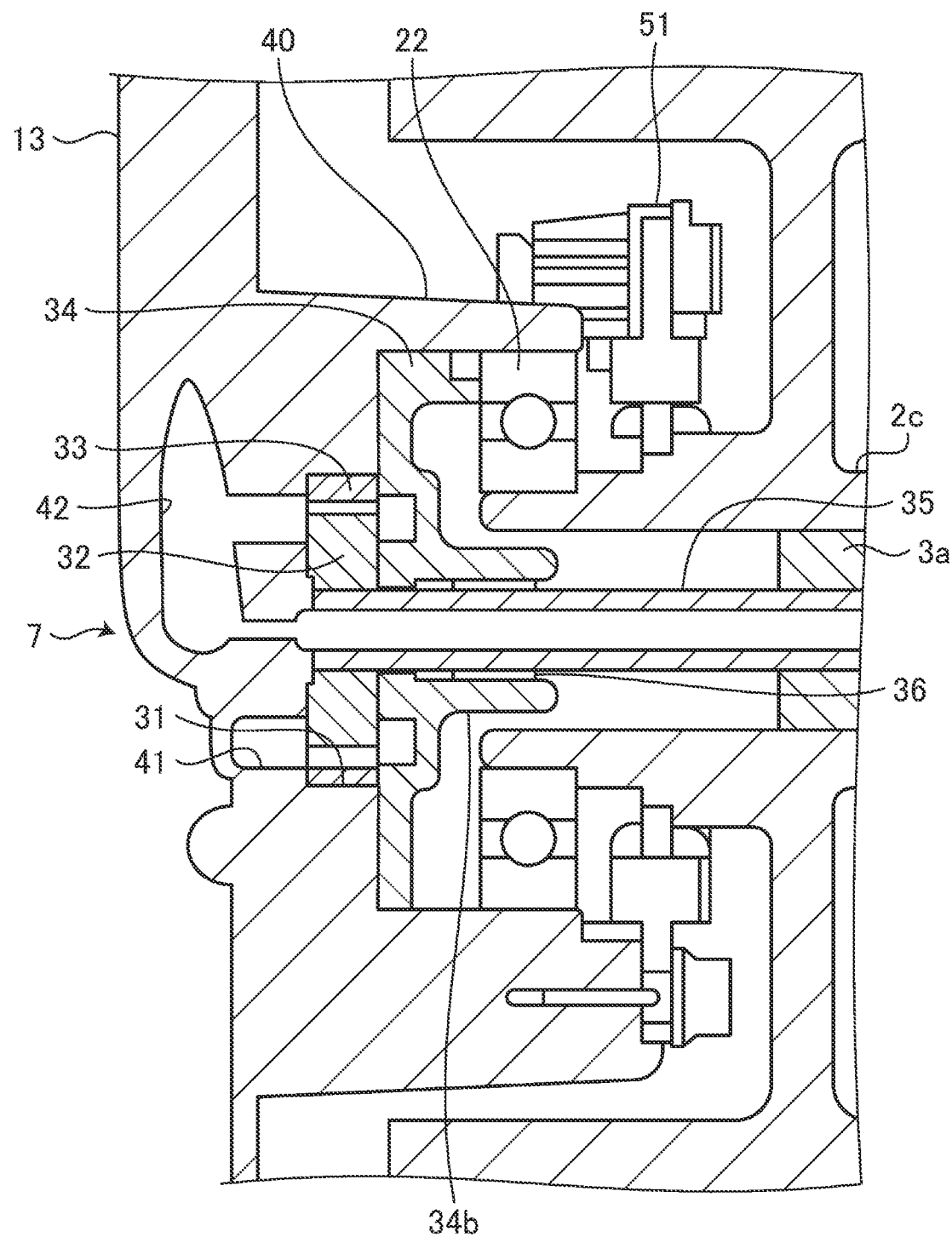
FIG. 2 is a diagram for explaining an oil pump.

As shown in FIG. 2, the oil pump 7 has a pump chamber 31, a drive gear 32, a driven gear 33, a pump cover 34 and a pump shaft 35.

Figure 3:
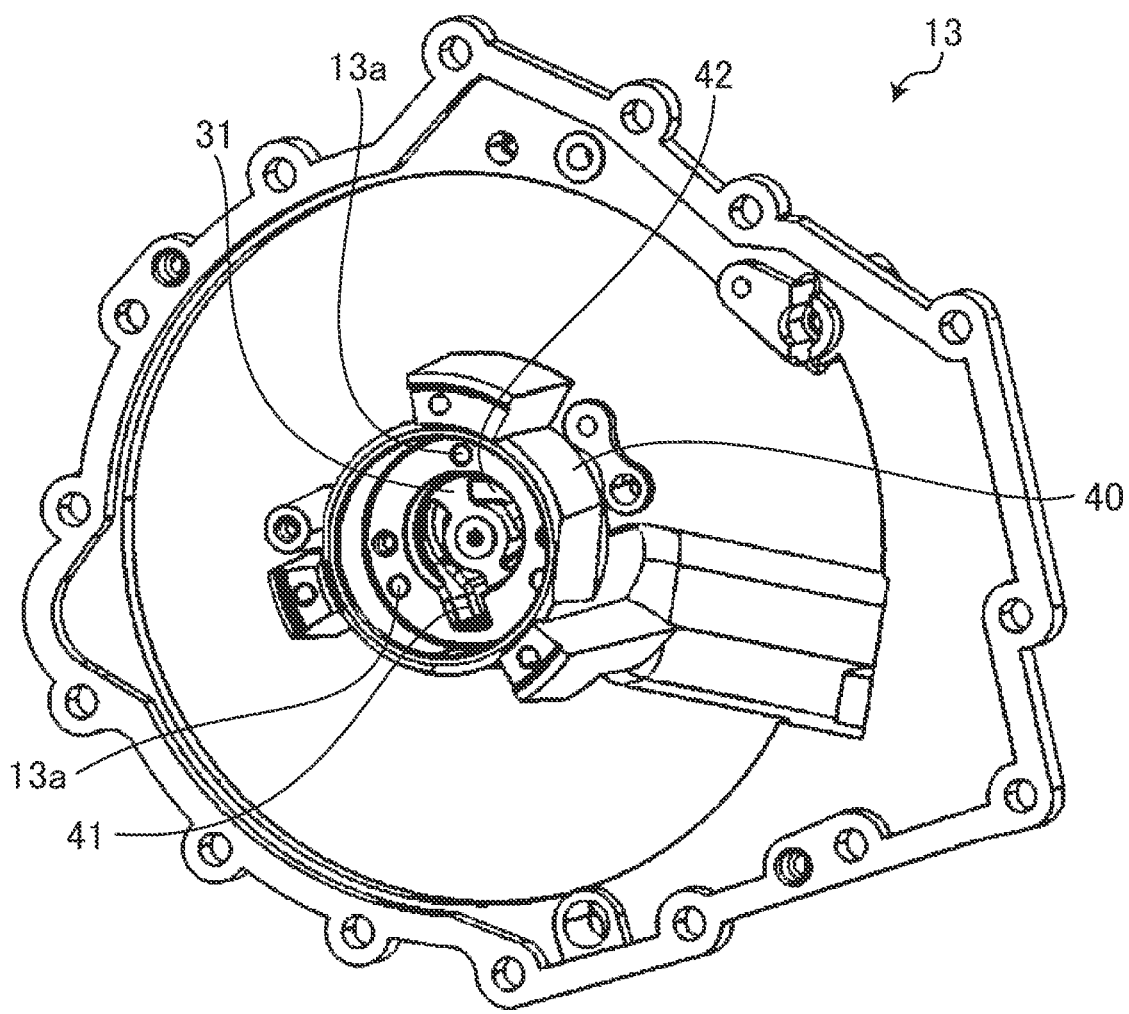
FIG. 3 is a diagram showing a motor cover.

The pump chamber 31 is formed in the inner wall of the motor cover 13, as shown in FIG. 3. The inner wall of the motor cover 13 is provided with a recessed pump chamber 31 that is recessed toward the other end in the axial direction. The motor cover 13 serves as a pump body for the oil pump 7. The pump chamber 31 is formed on the central axis of rotation of the rotor shaft 2c and the gear shaft 3a. A drive gear 32 and a driven gear 33 are arranged inside the pump chamber 31.

Figure 4:
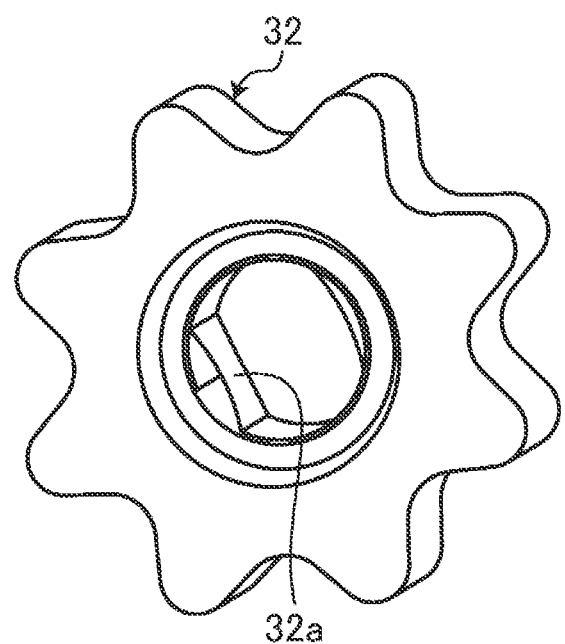
FIG. 4 is a diagram showing the drive gear of the oil pump.
Figure 5:
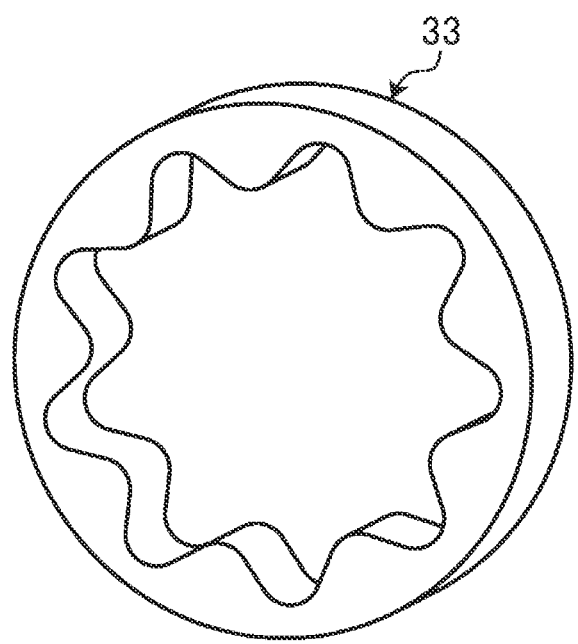
FIG. 5 is a diagram showing the driven gear of the oil pump.

The drive gear 32 is composed of an inner rotor, as shown in FIG. 4. The driven gear 33 is composed of an outer rotor, as shown in FIG. 5. Driven gear 33 meshes with drive gear 32.

A pump cover 34 is attached to the motor cover 13 and closes the pump chamber 31. The oil pump 7 has a structure in which a pump cover 34 is attached to the motor cover 13 so that the drive gear 32 and the driven gear 33 cannot be pulled out into the pump chamber 31 formed in the motor cover 13. In the oil pump 7, the pump cover 34 is fastened from the inside of the case 4 using bolts. The bolts are screwed into the pump cover 34 and the motor cover 13 in this order from the inside of the case 4.

Figure 6:
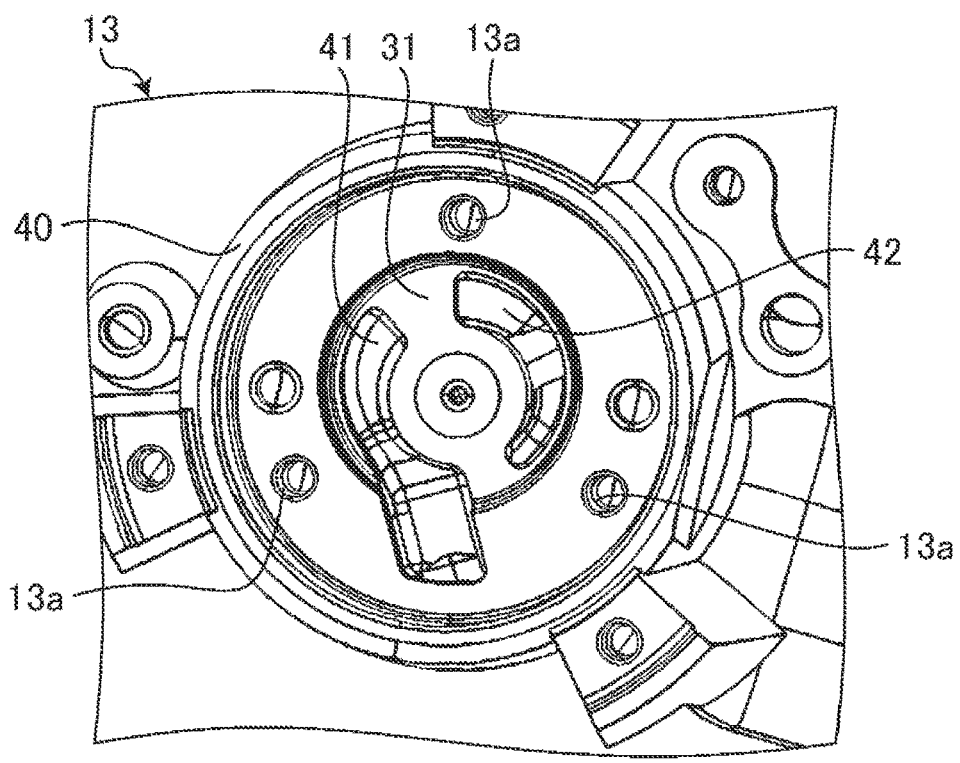
FIG. 6 is a diagram showing a housing portion and a pump chamber formed in the motor cover.
Figure 7:
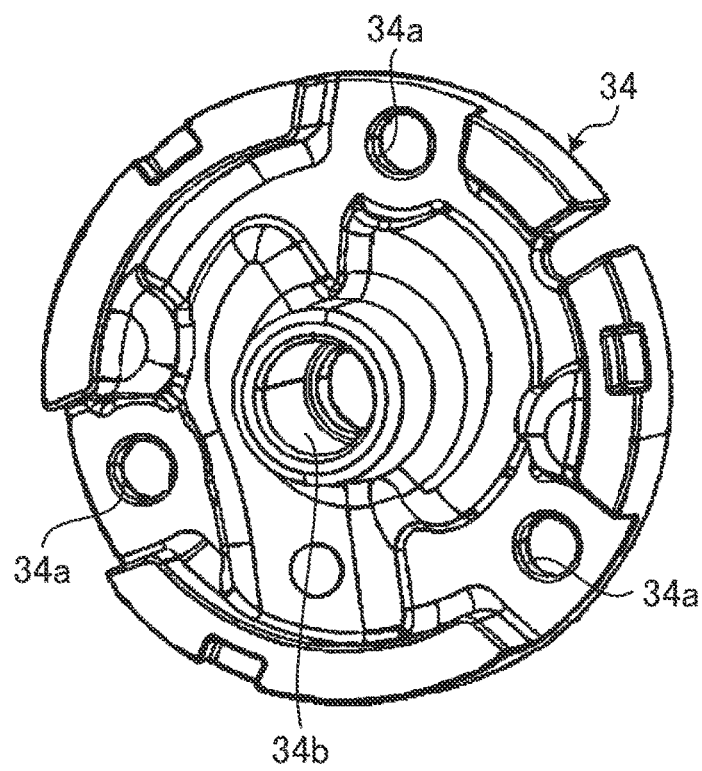
FIG. 7 shows the pump cover.

The motor cover 13 has bolt holes 13a, as shown in FIG. 6. The bolt hole 13a is a hole recessed from the inner wall surface of the motor cover 13 toward the other side in the axial direction. The bolt hole 13a does not pass through the motor cover 13. The pump cover 34 has bolt holes 34a, as shown in FIG. 7. The bolt hole 34a is a through hole penetrating the pump cover 34. The bolts are screwed into the bolt holes 34a of the pump cover 34 and the bolt holes 13a of the motor cover 13 in this order to fasten the pump cover 34 to the motor cover 13 from the inside of the case 4.

A housing portion 40 is formed in the motor cover 13. As shown in FIG. 2, the housing portion 40 is a portion that houses the pump cover 34 and is formed by the inner wall of the motor cover 13. The pump cover 34 is arranged inside the housing portion 40.

The housing portion 40 is formed in a tubular shape and protrudes toward the inside of the case 4 in the axial direction. The second bearing 22 is attached inside the housing portion 40. The outer ring of the second bearing 22 is attached to the inner peripheral surface of the housing portion 40. The housing portion 40 supports the rotor shaft 2c via the second bearing 22. Inside the housing portion 40, the pump cover 34 and the second bearing 22 are arranged side by side in the axial direction.

The pump shaft 35 is a rotating shaft that rotates together with the drive gear 32. A pump shaft 35 is provided to pass through the pump cover 34.

A positioning structure for positioning the pump shaft 35 is integrally formed on the pump cover 34. The positioning structure has a boss portion 34b through which the pump shaft 35 is inserted. This positioning structure supports the pump shaft 35 via a bearing 36 attached to the inner peripheral surface of the boss portion 34b. The bearing 36 is a slide bearing, and has an inner peripheral surface in contact with the pump shaft 35 and an outer peripheral surface in contact with the boss portion 34b.

The pump shaft 35 extends inside the rotor shaft 2c and is attached to the gear shaft 3a. The pump shaft 35 is spline-fitted with the gear shaft 3a. One end of the pump shaft 35 is formed with an external spline. An internal spline is formed at the other end of the gear shaft 3a. When the outer splines of the pump shaft 35 and the inner splines of the gear shaft 3a are meshed, the pump shaft 35 and the gear shaft 3a are spline-fitted.

The pump shaft 35 rotates together with the gear shaft 3a and the rotor shaft 2c. The in-wheel motor 1 includes a pump shaft 35 meshing with a drive gear 32 as a drive shaft for the oil pump 7. A through hole 32a having a width across flats is provided on the inner diameter side of the drive gear 32, as shown in FIG. 4. The through hole 32a of the drive gear 32 and the other end of the pump shaft 35 mesh with each other. An outer peripheral portion having a width across flats is formed at the other end of the pump shaft 35. By engaging the through hole 32a of the drive gear 32 and the outer peripheral portion of the pump shaft 35, the drive gear 32 and the pump shaft 35 are connected so as to be rotatable together. The pump shaft 35 is driven by the rotation of the rotor shaft 2c of the motor 2 through the gear shaft 3a of the reduction gear 3.

A method for assembling the oil pump 7 will be described. The process of assembling the oil pump 7 can be divided into the first half process included in the process of assembling the cover sub-assembly 100 and the latter half process after assembling the cover sub-assembly 110 to the motor case sub-assembly 200. In the first half process, assembly up to the pump cover 34 is completed, and in the second half process, assembly of the pump shaft 35 is completed.

First, the first half process will be described. The first half process includes the first to fifth processes.

As a first process of the first half process, the drive gear 32 and the driven gear 33 are assembled to the motor cover 13 so that the drive gear 32 and the driven gear 33 fit in the pump chamber 31. After that, the pump cover 34 arranged inside the housing portion 40 is fastened to the motor cover 13 so as to close the pump chamber 31.

Figure 8:
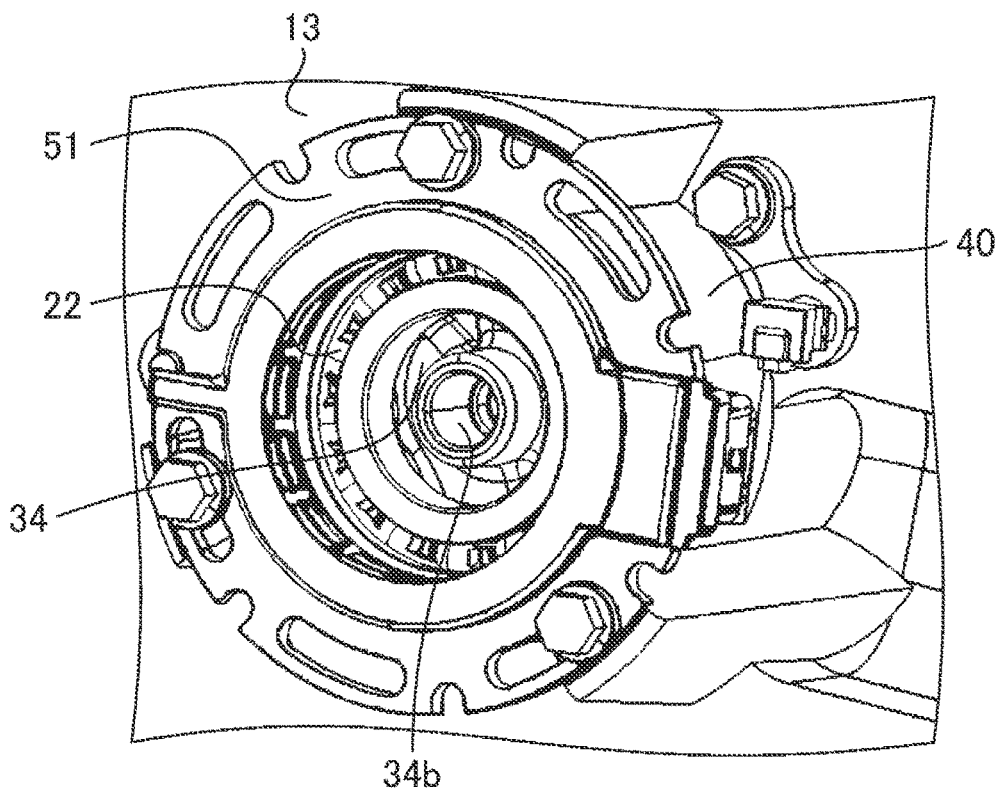
FIG. 8 is a diagram showing a state in which a bearing and a resolver are attached to the housing portion.

As a second step of the first half step, the second bearing 22 is attached to the motor cover 13. After that, the resolver 51 is attached to the motor cover 13. The resolver 51 detects the number of rotations of the rotor shaft 2c. Specifically, the second bearing 22 is attached inside the housing portion 40. After that, the resolver 51 is attached to the outside of the housing portion 40. As shown in FIG. 8, the resolver 51 is bolted to the outer portion of the housing portion 40. The completed state of the second step is shown in FIG. 8.

In the third process of the first half process, the wire harness of the resolver 51 is routed outside the motor cover 13 to form the cover sub-assembly 100. Cover sub-assembly 100 includes motor cover 13, drive gear 32, driven gear 33, pump cover 34, second bearing 22, and resolver 51. The first to third steps are steps for assembling the cover sub-assembly 100.

In the fourth process of the first half process, the first bearing 21 and the rotor 2a, the rotor shaft 2c and the stator 2b are assembled to the motor case 11 to form the motor case sub-assembly 200. Motor case sub-assembly 200 includes motor case 11, motor 2, and first bearing 21. A fourth step is to assemble the motor case sub-assembly 200.

As the fifth process of the first half process, the cover sub-assembly 100 is assembled to the motor case sub-assembly 200. When the fifth step is completed, the first half step is completed.

Next, the latter half of the process will be described with reference to FIGS. 9 to 12. The second half process includes the first to fourth processes.

Figure 9:
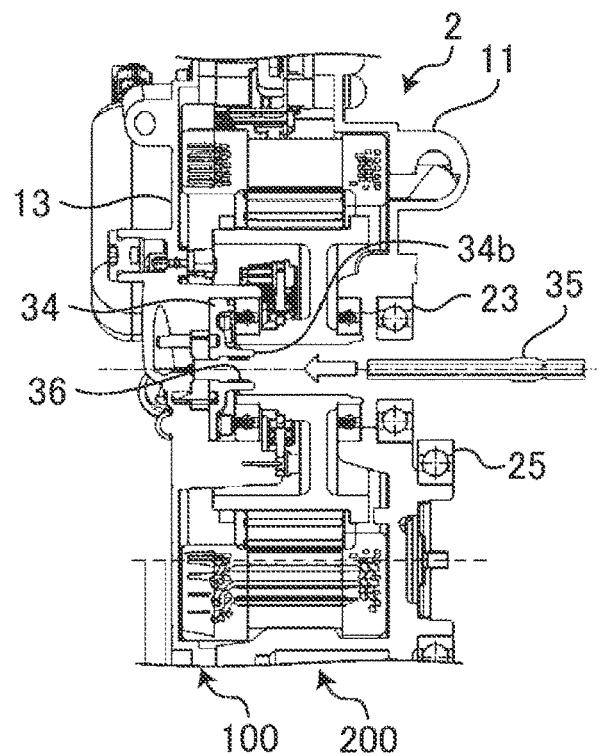
FIG. 9 is a diagram for explaining an assembly method when assembling the pump shaft.

As a first step of the latter half of the process, as shown in FIG. 9, the pump shaft 35 is assembled to the drive gear 32 by placing the through hole 32a having a width across flats and located on the inner peripheral side of the drive gear 32 in phase with the width across flats formed in one end of the pump shaft 35.

Figure 10:
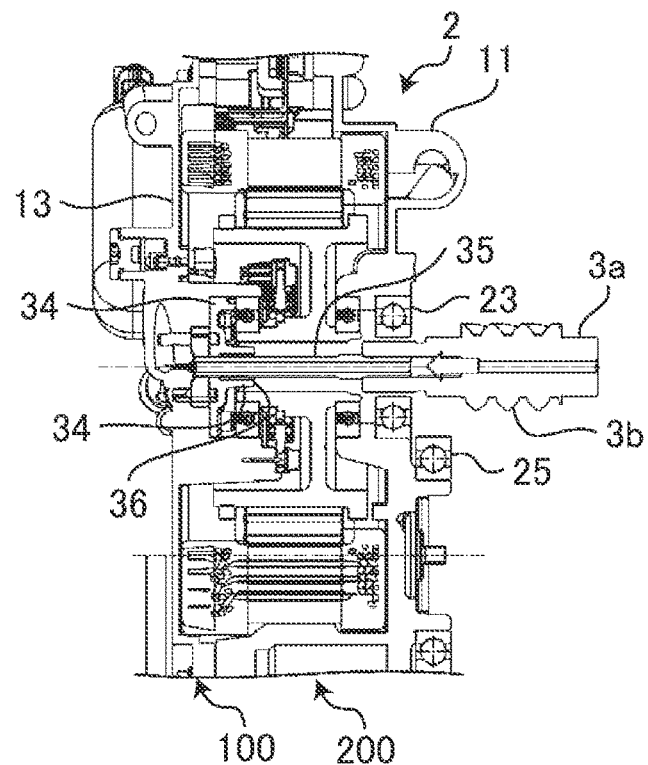
FIG. 10 is a diagram for explaining an assembly method when assembling the gear shaft.

As a second step of the latter half of the process, as shown in FIG. 10, the phases of the inner spline provided on the other end of the gear shaft 3a and the outer spline provided on one end of the pump shaft 35 are adjusted to match the phases, and gear shaft 3a is assembled to the pump shaft 35. The gear shaft 3a is inserted by aligning the phases of the splines.

Figure 11:
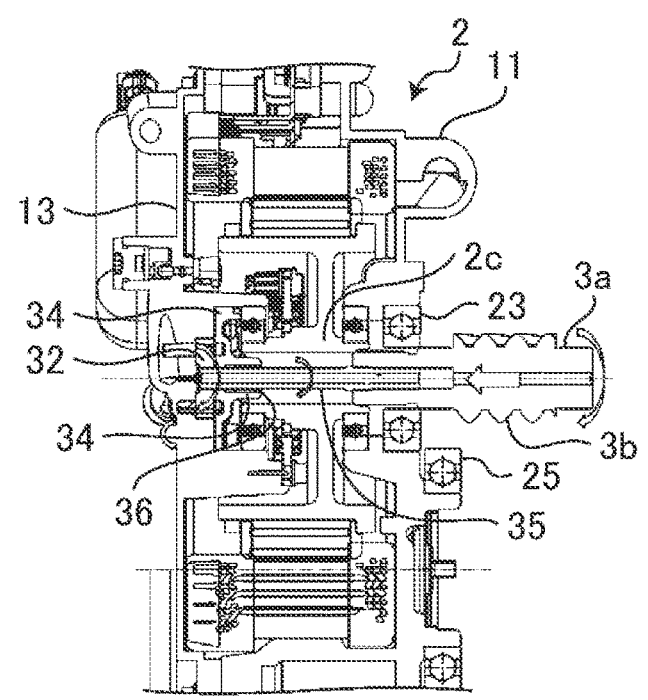
FIG. 11 is a diagram for explaining the step of matching the phases of the pump shaft and the gear shaft.

As the third step of the latter half, as shown in FIG. 11, while rotating the gear shaft 3a, the inner spline provided on one end of the rotor shaft 2c and the outer spline provided on the other end of the gear shaft 3a are rotated. The gear shaft 3a is assembled to the rotor shaft 2c by matching the phases.

Figure 12:
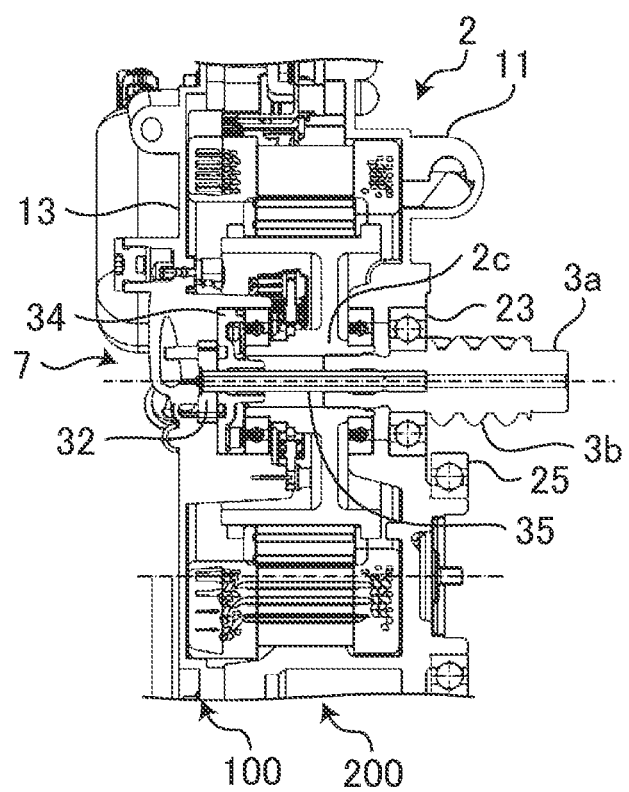
FIG. 12 is a diagram showing a state in which the gear shaft is assembled.

As a fourth step of the latter half of the steps, as shown in FIG. 12, the gear shaft 3a is inserted until it abuts on the third bearing 23. When the fourth step is completed, the second half step is completed.

As described above, according to the embodiment, since the pump cover 34 is attached to the motor cover 13 from the inside of the case 4, oil leakage due to the hydraulic pressure of the oil pump 7 can be reduced. Moreover, according to the structure of the oil pump 7, assembly of the in-wheel motor 1 is facilitated.

What is claimed is:

1. An in-wheel motor comprising:
   a motor mounted inside a wheel;
   a reduction gear including an input shaft attached to a rotor shaft of the motor and configured to transmit power of the motor to the wheel;
   a case housing the motor and the reduction gear; and
   an oil pump disposed in the case, the case including a motor case housing the motor, a motor cover attached to the motor case, and a reduction gear case attached to an opposite side of the motor case from the motor cover and housing the reduction gear, wherein:
   the oil pump includes
      a pump chamber in the motor cover,
      a pump cover attached to the motor cover and closing the pump chamber,
      a pump shaft extending through the pump cover,
      a drive gear attached to the pump shaft and disposed in the pump chamber, and
      a driven gear meshing with the drive gear and disposed in the pump chamber;
   the pump shaft is attached to an input shaft of the reduction gear;
   the pump cover is bolted to the motor cover from inside the case; and
   a positioning structure that positions the pump shaft is molded integrally with the pump cover.

2. The in-wheel motor according to claim 1, wherein the positioning structure includes a boss portion through which the pump shaft is inserted, and the positioning structure supports the pump shaft via a bearing attached to an inner peripheral surface of the boss portion.

3. The in-wheel motor according to claim 1, wherein the motor cover includes a housing portion having a tubular shape, protruding toward inside of the case in an axial direction, and housing the pump cover, the in-wheel motor further comprising:
   a bearing attached to inside of the housing portion and configured to rotatably support the rotor shaft; and
   a resolver attached to outside of the housing portion and configured to detect the number of rotations of the rotor shaft.

* * * * *